US005692868A

United States Patent [19]

Riemersma

[11] Patent Number: 5,692,868

[45] Date of Patent: Dec. 2, 1997

[54] SYSTEM AND METHOD FOR UNLOADING BULK MATERIAL FROM A SEMI-RIGID CONTAINER

[75] Inventor: Keith A. Riemersma, Holland, Mich.

[73] Assignee: National Bulk Equipment, Inc., Holland, Mich.

[21] Appl. No.: 757,923

[22] Filed: Nov. 27, 1996

[51] Int. Cl.$^6$ .................................................... B65G 65/23

[52] U.S. Cl. ....................... 414/403; 222/105; 222/181.2; 294/68.21

[58] Field of Search .................................... 414/403, 411, 414/415; 222/105, 181.2; 294/68.21

[56] References Cited

U.S. PATENT DOCUMENTS

| | | | |
|---|---|---|---|
| 2,858,051 | 10/1958 | Cunningham | 222/105 |
| 3,179,268 | 4/1965 | Hatch | 294/68.21 |
| 4,810,156 | 3/1989 | Pendleton et al. | 414/415 |
| 5,320,251 | 6/1994 | Ellis | 222/181.3 |
| 5,333,757 | 8/1994 | Volk et al. | 222/105 |

FOREIGN PATENT DOCUMENTS

| | | | |
|---|---|---|---|
| 484328 | 10/1929 | Germany | 414/411 |

*Primary Examiner*—Thomas J. Brahan

*Attorney, Agent, or Firm*—Flynn, Thiel, Boutell & Tanis, P.C.

[57] ABSTRACT

A hanger for facilitating the unloading of loose material stored in bulk form in semi-rigid containers. The hanger includes a frame that is positioned over the container. The container is attached to the frame along its outer perimeter by a number of pivoting arms. The arms are biased so that in the absence of a counteracting force, they pivot inwardly towards the center of the container. When a loaded container is initially attached to the hanger, the arms hold it in a fully expanded state. As the container is emptied from a bottom opening, the weight of the container drops, allowing the biasing members to pivot the arms inwardly and upwardly. The inward movement of the arms results in the arms moving the outer perimeter of the bag inwardly and upwardly. Consequently, the lower portion of the container takes on a conical profile to facilitate the emptying of the contents from the container.

12 Claims, 6 Drawing Sheets

SYSTEM AND METHOD FOR UNLOADING BULK MATERIAL FROM A SEMI-RIGID CONTAINER

FIELD OF THE INVENTION

This invention relates generally to a system and method for unloading bulk material from a semi-rigid container and, more particularly to a system and method for unloading material in loose form from a semi-rigid plastic bag.

BACKGROUND OF THE INVENTION

The raw materials for many manufacturing processes consists of loose material that is transported and stored in large containers before use. For example, in manufacturing facilities where plastic is formed, the raw plastic is in pellet form. The pellets are transported from their place of manufacture and are stored in large containers until they are loaded in a plastic molding machine. In the past, it has been common to transport and store the pellets in large cardboard boxes known as gaylords. Once a gaylord is emptied of pellets, it is broken down and returned to the plastic manufacturing plant so it can be reassembled and reused. While cardboard gaylords have worked well as transport and storage containers for loose material, they do have a significant disadvantage. Even when an empty gaylord is disassembled, it is still a rather large object that occupies a significant amount of space and can be difficult to handle. Moreover, at the facility at which the gaylord is emptied, personnel need to spend time disassembling it prior to shipment. At the facility at which it is refilled, time must likewise be spent reassembling it so it can again be used as a storage container. Furthermore, owing to the inherent limited malleability of the cardboard forming the gaylord, it can only be disassembled and reassembled a maximum number of times before it starts to wear out. Thus, each gaylord can only be used a fixed number of times as a bulk storage container.

Recently there have been efforts made in the plastic industry to substitute large, semi-rigid plastic bags for gaylords. It is the practice to form these bags to have main bodies that have a generally rectangular shape. This facilitates the storage of the greatest number of filled bags in a given space. Each bag is provided with a top opening in the main body through which it is filled. Each bag is further formed with a reduced diameter neck which, relative to the main body, extends downwardly therefrom. The end of the neck functions as the opening through which the pellets in the bag are discharged into a complementary opening for the plastic molding machinery. Typically the bag is further provided with a liner that surrounds the inside surfaces of the bag. The liner prevents the material stored in the bag from coming in contact with the bag. Thus, once the bag is emptied, the liner is removed and the bag is then easily collapsed for transport back to the facility where the plastic pellets are formed. At the plastic manufacturing facility, it is a relatively simple matter to expand the bag so that a new liner can be fitted therein. Once the new liner is in place, the bag is refilled with pellets or other loose material that is shipped in bulk. The refilling of the bag automatically returns the bag to its large, full capacity shape.

While the use of semi-flexible bags as bulk transport and storage containers has proved advantageous over the previously used rigid cardboard boxes, there are some problems associated with their use. One of the most significant problems has been that it has proven difficult to provide a means for easily unloading the bags so as to ensure that all the material contained therein is removed. This has proven difficult because of the flexible nature of the bags makes it difficult to tilt them to ensure that their contents can be accessed for removal. One method of removal that has been tried is disclosed in U.S. Pat. No. 4,810,156. This method requires providing a set of pneumatically actuated petals that move against the bottom of the bag. A processor is used to regulate petal displacement. Providing the components to practice this method can be expensive.

SUMMARY OF THE INVENTION

This invention is directed to a new and improved system and method for removing the contents of a semi-rigid bulk storage container in such a way as to ensure the removal of all the material stored in the container with the minimal amount of human assistance. More particularly, this invention employs the changing weight of the container as a balance force to facilitate the removal of its contents.

The bulk material unloader of this invention includes a hanger assembly from which the bag or another semi-rigid container is suspended and transported to the station where the container is unloaded. The hanger includes a frame that itself is attached to an overhead crane system capable of moving the hanger and container attached thereto from point-to-point in a manufacturing facility. The container is attached to the frame at two different sets of locations along the top of the container. The first of these locations is its outer corners. These hanger-to-container connections are made through a set of biased arms that are pivotally attached to the frame of the hanger. The second of these locations is to a center point at the top of the bag. When the hanger is used to transport a container with a liner, this connection is made to the liner. This connection is made to a movable connecting unit that is biased to remain in close proximity to the frame.

When a semi-rigid container, such as a bag, is initially attached to the hanger of this invention, the weight of the material in the bag causes the arms to outwardly pivot. This weight also overcomes the biasing force that holds the connecting unit attached to the center of the bag or any complementary liner close to the frame. Consequently, when the hanger is so configured, the hanger holds the bag so that its main body is stretched into a fully expanded state. As the bag is emptied, the weight of the material therein is reduced. Consequently, as the gross weight of the bag drops, the arms displace the outer perimeter of the bag inwardly and upwardly while the center connecting unit causes the upward displacement to the center of the bag. Collectively, these motions cause the bottom of the container and complementary liner to develop a conical profile. The formation of this conical section in the bag and liner ensures that gravity will force the material in the container to fall therefrom through the neck opening.

Thus, the bulk material unloader of this invention provides a convenient means for unloading loose material from a semi-rigid container that does not require significant human supervision or action.

BRIEF DESCRIPTION OF THE DRAWINGS

The invention will be pointed out with particularity in the appended claims. The above and further advantages of the invention may be better understood by reference to the following detailed description taken in conjunction with the accompanying drawings, in which:

DETAILED DESCRIPTION

Figure 1:
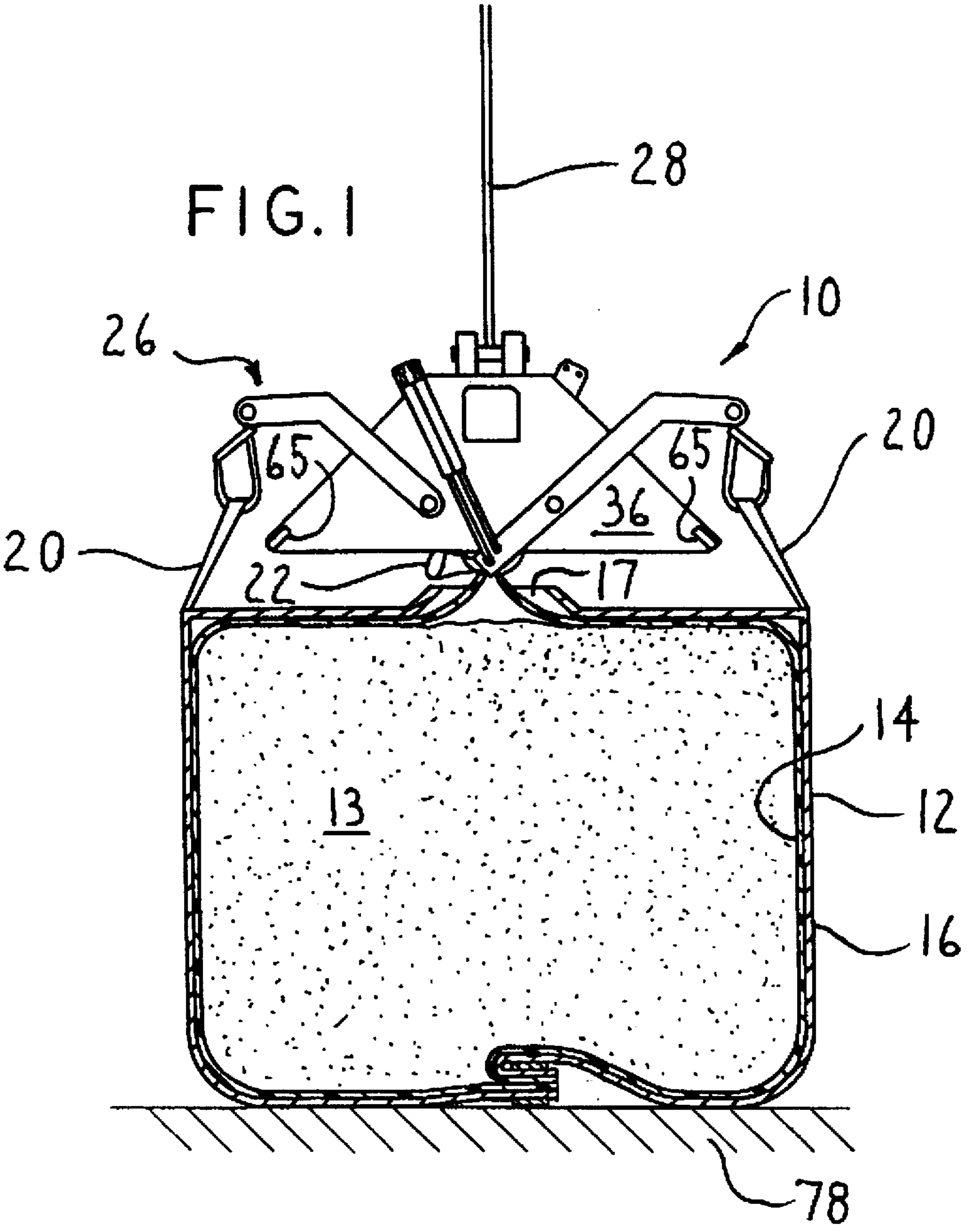
FIG. 1 is a cross-sectional side view of the bulk material unloader of this invention and, more particularly, how a semi-rigid bag is initially attached to a bag hanger.

FIG. 1 illustrates a bulk unloading system 10 of this invention that is used to facilitate unloading the contents 13 of a semi-rigid bag 12. A liner 14 is fitted in bag 12 so as to function as a protective layer between the material that is placed in the bag and the bag itself. The bag 12 is formed to have a main body 16 that takes on a rectangular shape when the bag is substantially filled. Bag main body 16 is formed to define a top opening 17 through which the bag is filled. A reduced-diameter neck 18 is formed integrally with the main body 16 of the bag 12 so as to extend downwardly therefrom, as best seen by reference to FIG. 6A. The neck 18 is open ended and the liner 14 is seated in the neck so as to extend therethrough. When the bag 12 is to be emptied of its contents 13, the end of the liner 14 extending through neck 18 is cut so as to form an opening. The main body 16 of the bag is provided with straps 20 that are located at the corners of the bag around the upper surface of the bag. The liner 14 is formed with a tail section 22 that extends through the bag top opening 17. As will be described hereinafter, bag straps 20 and liner tail 22 are used to connect the bag 12 to the bulk unloading system 10.

Figure 2:
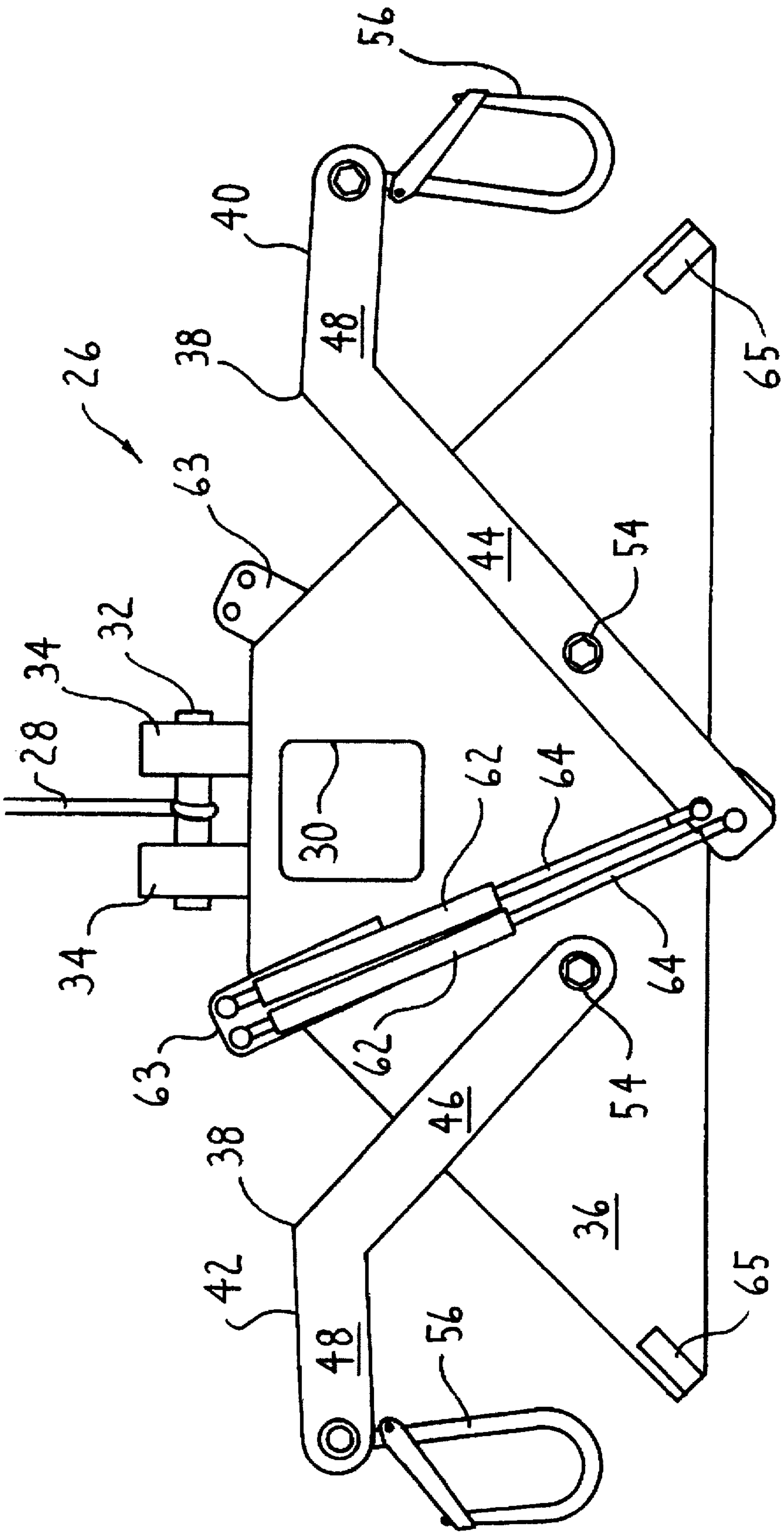
FIG. 2 is a front/rear face view of the bag hanger.
Figure 3:
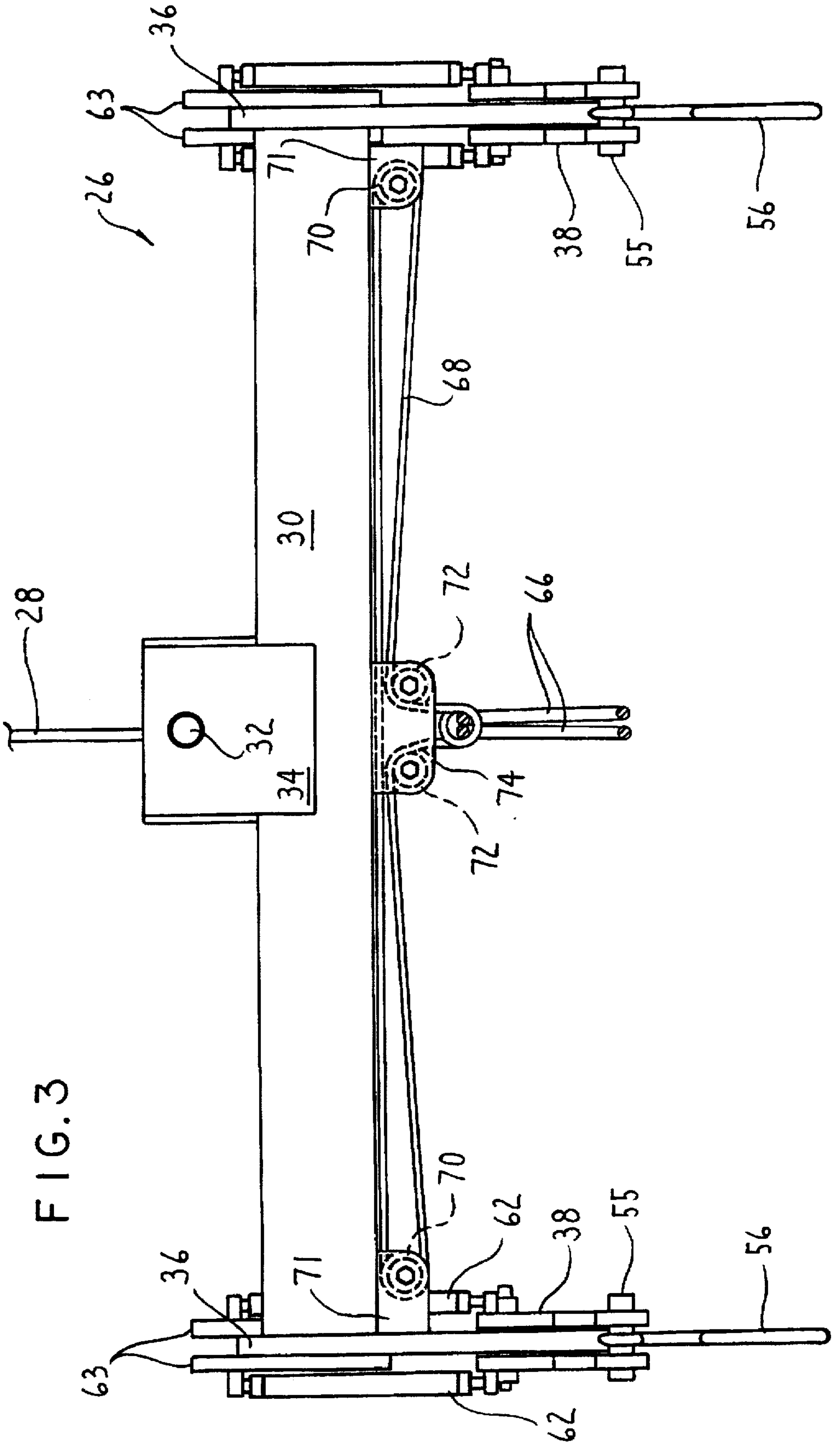
FIG. 3 is a side view of the bag hanger.

The bulk unloading system 10 includes a bag hanger 26 for moving the fully loaded bag 12 between different points in the facility in which the system is installed. Bag hanger 26 is suspended by a cable 28 to a conventional overhead crane, not illustrated, responsible for vertically and horizontally moving the bag hanger 26 and the bag 12 attached thereto. The line along which cable 28 extends defines a vertically extending center axis of the bag hanger 26. As best seen by FIGS. 2 and 3, bag hanger 26 includes a hollow cross beam 30 that has a square profile. Cable 28 is secured around a pin 32 fixed above the center of cross beam 30 by two opposed rectangular plates 34. A pair of face plates 36 attached to the opposed ends of cross beam 30 form the front and rear faces of bag hanger 26. In the depicted version of the invention, face plates 36 have a trapezoidal shape such that the bottom edges thereof are longer than the opposed, parallel top edges.

Figure 4:
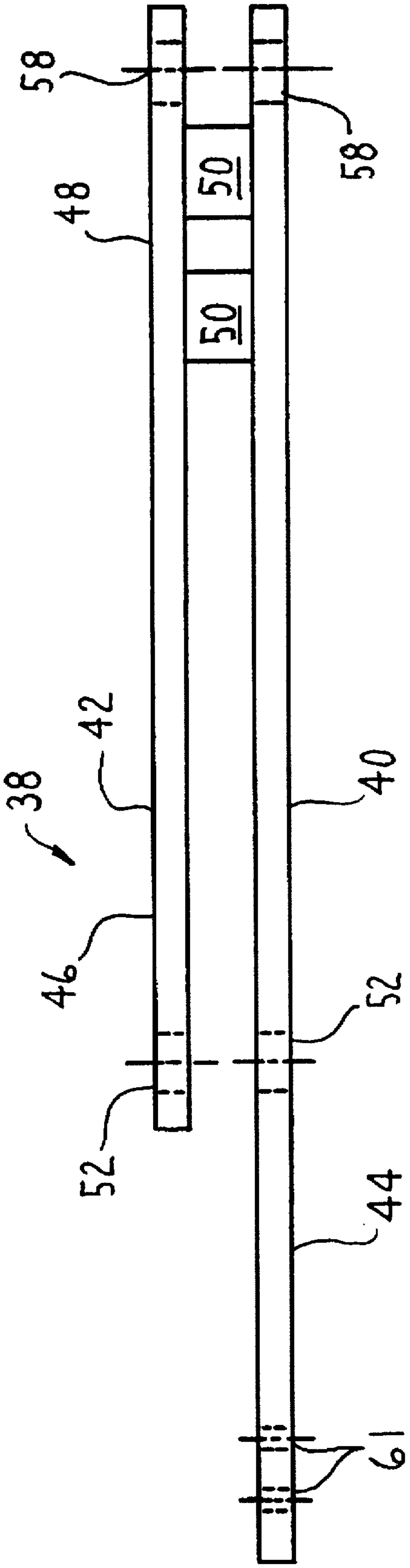
FIG. 4 is a top view of arm that forms part of the bag hanger.

The straps 20 attached to the bag 12 are attached to arms 38 that are pivotally mounted to the bag hanger face plates 36. Each arm 38, as seen by FIG. 4, is formed from two flat bars 40 and 42 that are positioned side-by-side and spaced apart from each other. Bars 40 and 42 are shaped to form base sections 44 and 46, respectively. In the depicted version of the invention, the base section 44 of arm 40 is longer than the base section 46 of arm 42. Bars 40 and 42 are further formed with identical stem sections 48 that are angled relative to the associated base sections 44 and 46. Bars 40 and 42 are connected together by two solid fastening sleeves 50 that extend between the stem sections 48. The base sections 44 and 46 of bars 40 and 42, respectively, are formed with concentric openings 52 through which a fastening pin 54 (FIG. 2) is secured for pivotally mounting the arm 38 to the associated face plate 36. A hook 56 is coupled to a pin 55 seated in concentric openings 58 formed in the stem sections 48 of the bars 40 and 42. The hooks 56 are used to secure the straps of the bag 12 to the arms 38.

Figure 5:
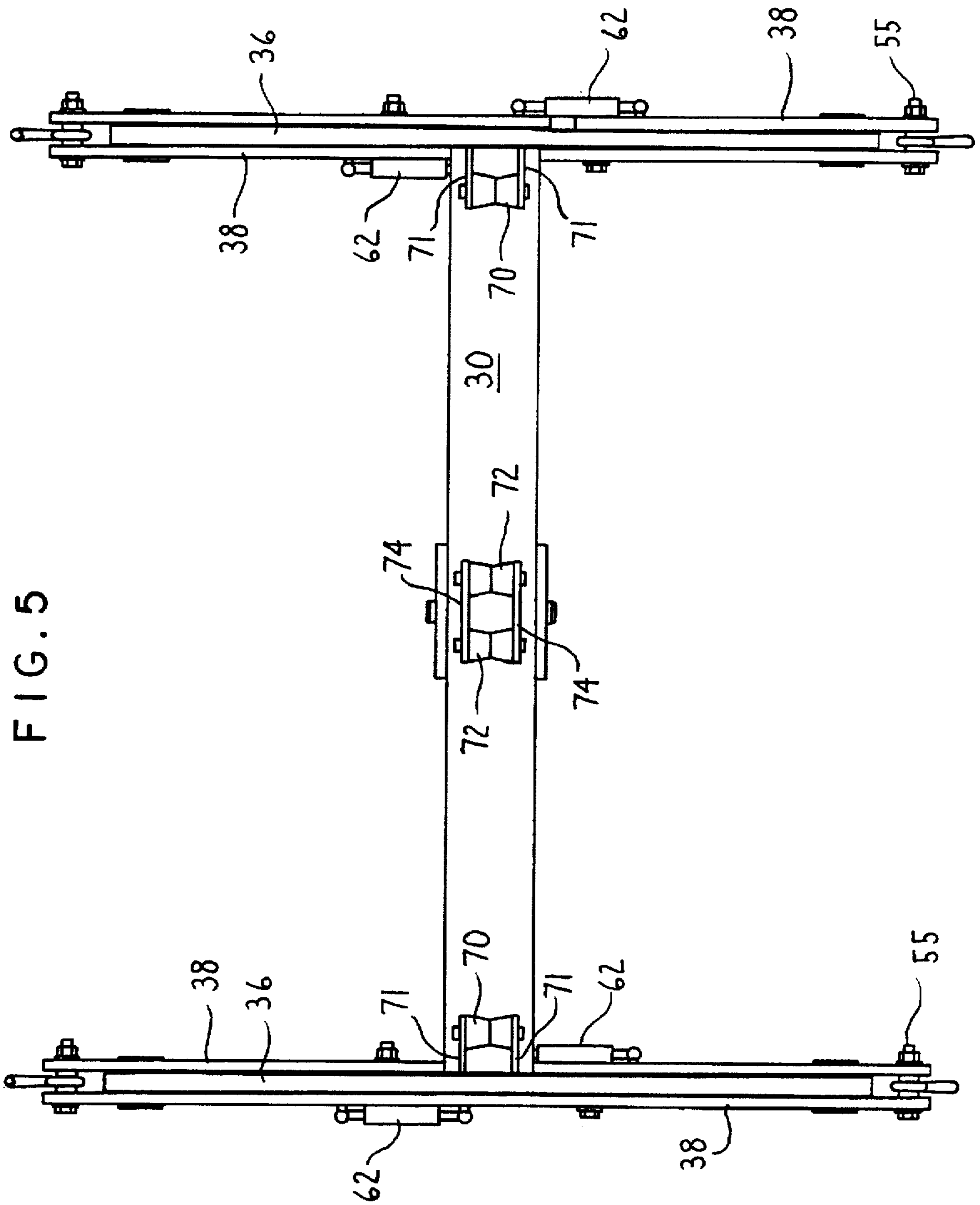
FIG. 5 is a bottom view of a partially disassembled bag hanger.

Each arm 38 is fitted over the face plate 36 to which it is attached so that the base sections 44 and 46 of the arm bars 40 and 42, respectively, are located on the opposed sides of the face plate, as best seen by FIGS. 2, 3 and 5. The fastening pin 54 extends through an opening in the face plate 36 so as to pivotally secure the arm thereto. Two arms 38 are attached to each face plate 36. The arms 38 are attached to the face plate 36 so that on each side of the face plate there is the long length base section 44 of a first one of the arms and the short length base section 46 of the second arm. This arrangement ensures that both arms 38 can freely pivot without abutting each other.

A spring biasing unit 62 is connected to the end of the bar base section 44 of each arm 36 to pivot the arm so that the hook end thereof is positioned towards the center of the face plate 36. In the depicted version of the invention, each arm 38 is biased by two parallel aligned pneumatically damped spring biasing units 62. The front end of each spring biasing unit 62, the end with the unit casing, is attached to a plate-like mounting tab 63 that extends diagonally outwardly from a side edge of the face plate 36. Each spring biasing unit 62 has a normally outwardly extending arm 64. The arms 64 of the spring biasing units 62 are the portions of the spring biasing units that are secured to the end of the base section 44 of the bar 40 integral with the arm 38. As seen in FIG. 4, the butt end of the base section 44 of each arm 38 is provided with a pair of bores 61 for receiving fastening elements used to secure the arms 64 to the arm.

The face plates 36 of bag hanger 26 are also provided with stop blocks 65. Blocks 65 are located in the lower corners of the face plates 36. Blocks 65 extend outwardly from the opposed sides of face plates 36 to block downward rotation of the arms 38.

The tail 22 of liner 14 internal to bag 12 is secured to a pair of rings 66 that are suspended from bag hanger 26 adjacent the center of cross beam 30. In the depicted version of the invention, rings 66 are secured to an elastic cord 68 that is attached to the bag hanger 26. This particular cord 68 can be used to suspend bags 12 that have a filled weight of up to 4,000 pounds. The ends of the cord 58 are secured to adjacent locations on the top of the rings 66. The sides of the cord 68 are looped around pulleys 70 that are fitted to tabs 71 attached to the opposed ends of the cross beam 30. The sections of the cord 68 to which the rings 66 are attached extended downwardly over separate, spaced apart pulleys 72 spaced apart from each other around the horizontal center line of cross beam 30. Pulleys 72 are rotatably mounted between two mounting plates 74 that are secured to cross beam 30.

The bulk unloading system 10 of this invention is initially connected to the bag 12 with which it is used at a bag load station 78 as seen in FIG. 1. Initially, owing to the weight of the contents 13 in the main body 16 of the bag 12, the neck 18 of the bag may be folded over and may not be ready visible. At the bag loading station 78, the tail 22 of the liner 14 is secured to the rings 66 of the bag hanger 26. The straps 20 of the bag 12 are fitted over the hooks 56 associated with pivoting arms 38.

Once the bag 12 is secured to the bag hanger 26, cable 28 is retracted by the crane so as to cause the hanger and bag to move upwardly. Once the bag 12 moves off the bag loading station 78, the weight of the bag and the contents 13 therein produce downward force on bag hanger 26 that is greater than the upward forces produced by biasing units 62 and elastic cord 68. Consequently, as represented by FIG. 6A, the filled bag 12 suspends itself from the bag hanger 26. As a result of this suspension, the arms 38 of the bag hanger 36 pivot downwardly, their movement being stopped by blocks 65. Consequently, when the bag 12 is in this state, the hooks 56 are at their farthest outward position relative to the center of the bag hanger 26. This wide open positioning of the hooks 56 thus serves to suspend the main body of the bag in a relatively wide fully opened position.

The crane to which the cable 28 is attached is actuated to position the bag over in the intake duct 80 associated with the equipment designed to receive the contents of the bag. More particularly, it can be seen that the liner 14 is fitted in the duct 80 while the neck 18 of the bag 12 is fitted around the outside of the duct 80. An inflatable collar 82 may be fitted around the neck 18 so as to provide a seal between the bag 12 and the duct 80. Once the bag 12 is so secured, a cutting device, not illustrated, may be used to cut the portion of the liner 14 in the neck 18 of the bag 12. The cutting of the liner allows gravity to act on the contents 13 of the bag so as to cause these contents to flow into the intake duct 80.

Without the action of the bulk unloading system 10 of this invention, not all of the contents 13 of the bag would flow into duct 80. For, as depicted in FIG. 6B, the contents 13 in the bag in the lower portion of the main body 16 that are spaced away from the neck 18, are without a direct gravity path to the opening in the bottom of the bag. Without additional assistance, this material would remain in the bag 12.

Figure 6C:
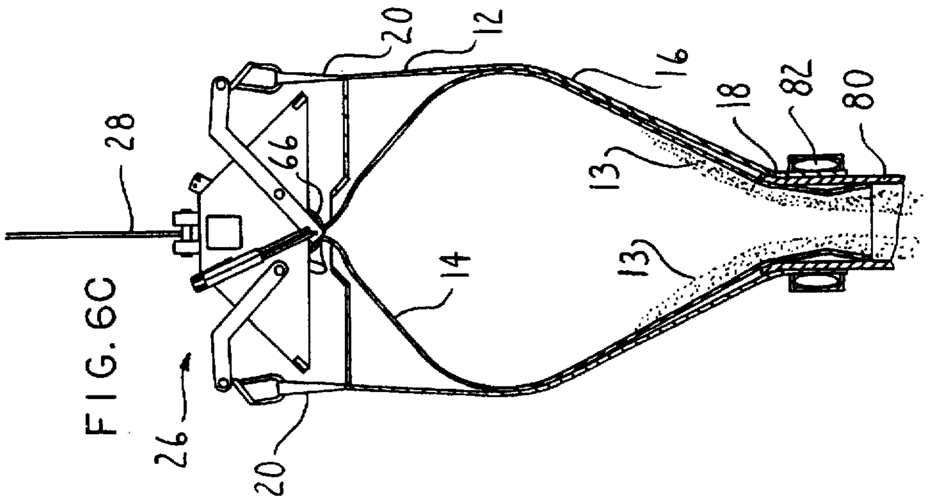
FIG. 6C is a cross-sectional side view illustrating how the contents of the bag are directed toward the opening in the bottom of the bag by the bag hanger of this invention.
Figure 6B:
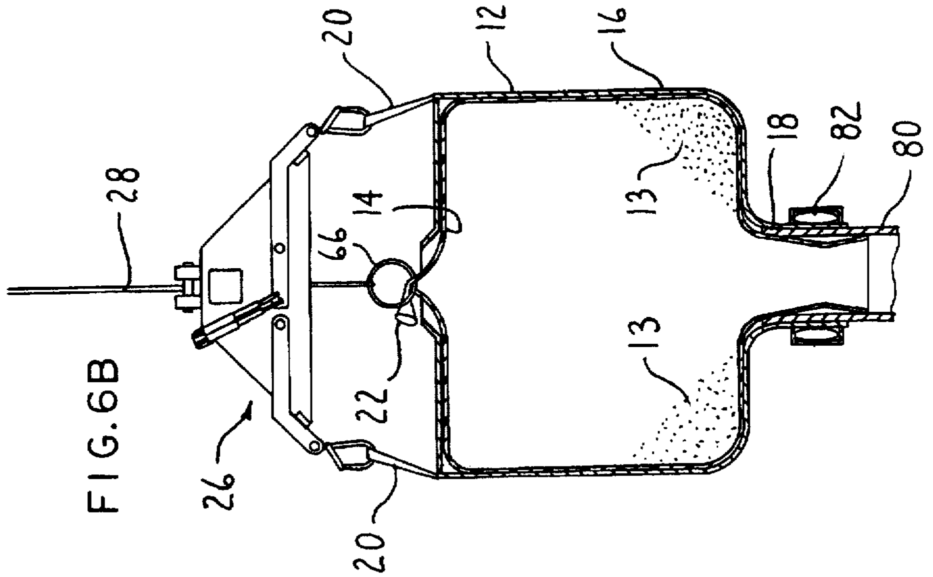
FIG. 6B is a cross-sectional side view illustrating how the contents of the bag could potentially become trapped in the lower corners of the bag.
Figure 6A:
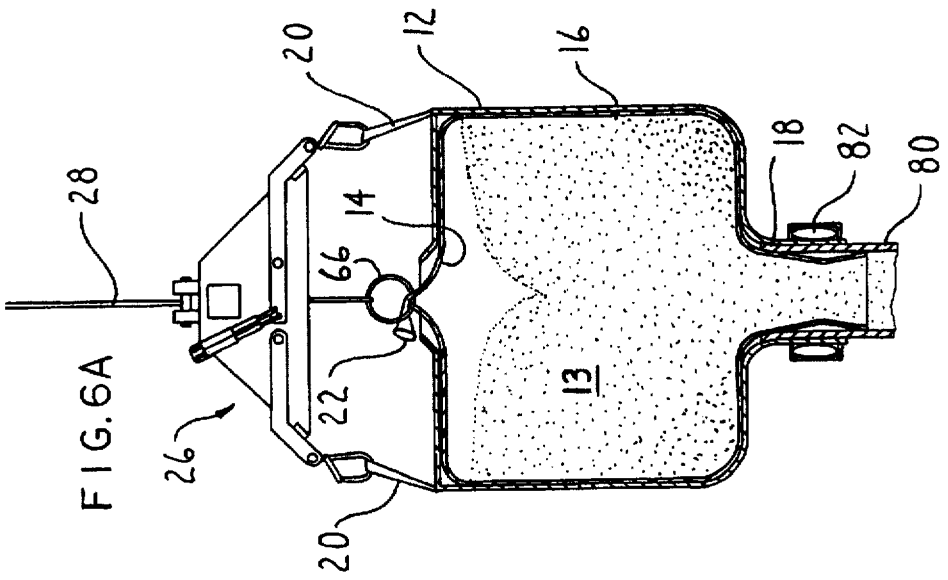
FIG. 6A is a cross-sectional side view illustrating how a fully loaded bag is suspended from the bag hanger of this invention.

However, as the contents 13 of the bag 12 empty into intake duct 80, the gross weight of the bag decreases, Consequently, as depicted by FIG. 6C, the forces imposed by biasing units 62 and elastic cord 68 of the bag hanger 26 of this invention, displace the bag 12 and liner 14. More specifically, the biasing units 62 start to pivot the arms 38 so that the hooks move diagonally upwardly and inwardly towards the center axis of the bag hanger 26. The elastic cord starts to pull the top of the liner 14 towards the bag hanger 26. Collectively, the inward displacement of the straps 20 of the bag 12 and the upward displacement of the tail 22 of liner 14 cause the lower portions of the bag and liner to take on a conical, inwardly tapered shape. As a result of the bag 12 and liner 14 taking on this conical profile, the contents 13 in the bottom of the bag 12 are directed towards the neck 18. Gravity acts on this material and causes it to be discharged from the bag into the intake duct 80. Thus, the entire contents 13 of the bag 12 are fully emptied from the bag with minimal, if any, human intervention.

Thus, the bulk unloading system 10 of this invention makes it possible to take a container which has a rectangular profile and reshape the lower section thereof into a conical profile so as to facilitate the rapid unloading of the material contained therein with minimal human intervention. Moreover, in the described version of the invention, the bag hanger 26 reshapes the bag without the assistance of a power unit. Thus, this version of the invention is relatively economical to both fabricate and operate.

It will be understood that the foregoing description is for the purposes of illustration only. It will be readily understood that alternative constructions of the bulk unloading system of this invention can be practiced using structures different from what has been disclosed above. For example, the pivoting arms 38 may be replaced by other devices that can suspend the bag in position and move its outer perimeter sections inwardly as the weight of the bag decreases. Likewise, it should be recognized that while the disclosed version of the invention include four pivoting arms, other versions of the invention may have less than or greater than this number of connecting devices.

It should be likewise be recognized that some versions of the invention may not be even necessary to connect the center of the container and any complementary liner therein to the hanger assembly. It should similarly be understood that still other versions of the invention may employ center connecting devices that are substantially different in structure from the ring-and-cord assembly that has been described. Moreover, while the unloading system is shown for being used with one particular type of container, a semi-rigid plastic bag containing a liner, should be recognized that it may be practiced with other types of flexible or semi-rigid containers including containers having different profiles from what has been shown. Also, while in preferred versions of the invention, the hanger does not employ any power units to displace the bag, in alternative versions of the invention, it may be desirable to provide such components. Therefore, it is the object of the appended claims to cover all such modifications and variations as come within the true spirit and scope of the invention.

The embodiments of the invention in which an exclusive property or privilege is claimed are defined as follows:

1. A hanger assembly for facilitating the unloading of a flexible container, said hanger assembly including:

a frame for positioning over the container, said frame having a vertically extending center axis;

a plurality of spaced apart fastening devices attached to said frame, said fastening devices configured for attachment to an upper portion of the container so that said plurality of fastening devices are attached to spaced apart locations around the container and wherein said fastening devices are attached to said frame so as to move between a set of first positions proximal to said center axis of said frame and a set of second positions distal from said center axis of said frame, wherein said first positions of said fastening devices are located above said second positions of said fastening deices; and a plurality of biasing assemblies, each said biasing assembly being connected between said frame and one of said fastening devices for applying a biasing force to urge said fastening device from said second position of said fastening device to said first position of said fastening device;

whereby the weight of the loaded container exceeds biasing forces of said biasing assemblies until the unloading of the contents from the container reduces the weight of the container such that said biasing assemblies move said fastening devices to said first positions so as to displace outer sections of the container inwardly and upwardly so that a bottom portion of the container develops an inwardly tapered profile to facilitate the emptying of the container.

2. The hanger assembly of claim 1, wherein: each said fastening device includes an arm that is pivotally attached to said frame and that includes an end distal from the pivotal attachment to said frame to which a section of the container is attached; and each said biasing assembly includes a biasing mechanism that extends between said frame and one of said arms that forces said arm upwardly and inwardly towards said center axis of said frame.

3. A hanger assembly of claim 2, further including: a center connecting device attached to said frame, said center connecting device being adapted to receive a center portion of the container that is located inwardly from the sections of the container to which said arms are attached; and a biasing mechanism extending between said frame and said center connecting device so as to urge said center connecting device upwardly towards said frame.

4. A hanger assembly of claim 1, further including: a center connecting device attached to said frame, said center connecting device being adapted to receive a center portion of the container that is located inwardly from the locations around the container to which said fastening devices are attached; and a biasing mechanism extending between said frame and said center connecting device so as to urge said center connecting device upwardly towards said frame.

5. The hanger assembly of claim 4, wherein said center connecting device includes a ring adapted to receive the center portion of the container.

6. The hanger assembly of claim 4, wherein said biasing mechanism extending between said frame and said center connecting device includes at least one elastic cord.

7. A bag hanger for suspending a semi-rigid bag, the bag being provided with an internal liner that separates the bag from the contents of the bag therein, said bag hanger including:

a frame having a vertically extending center axis;

a plurality of arms that are movably attached to said frame, wherein said arms are attached to said frame so as to move between a distal position relative to said center axis of said frame and a proximal position relative to said center axis of said frame, wherein the proximal position of each said arm is located above the distal position of said arm;

a plurality of outer fastening members, each said outer fastening member being attached to a separate one of said arms for securing an outer portion of the bag to said arm;

a plurality of arm biasing units, each said arm biasing unit being connected between said frame and one of said arms for applying a biasing force to said arm so to urge said arm to which said arm biasing unit is connected towards the proximal position;

a center connecting device located below said frame for attaching the liner in the bag thereto; and a center biasing unit connected between said frame and said center connecting device for urging said center connecting device upwardly towards said frame;

whereby the weight of the loaded bag exceeds the biasing forces of said arm biasing units until unloading of the contents from the bag reduces the weight of the bag such that said arm biasing units move said arms and said outer fastening members toward said center axis of said frame causing the outer portions of the bag to move inwardly and upwardly so that a bottom portion of the bag develops an inwardly tapered profile to facilitate emptying of the bag.

8. The bag hanger of claim 7, wherein said arms are pivotally mounted to said frame so as to move between a first position wherein said outer fastening members attached to said arms are located distal to said center axis of said frame and a second position wherein said outer fastening members are located proximal to said center axis of said frame.

9. The bag hanger of claim 7, wherein said center connecting device includes a ring adapted to receive a center portion of the liner.

10. The hanger assembly of claim 7, wherein said center biasing unit includes at least one elastic cord.

11. A method of unloading loose material from a semi-rigid container, the semi-rigid container having a main body and a neck that extends downwardly from the main body through which the material is unloaded, said method of unloading including the steps of:

suspending the container from a hanger at a number of locations around the outer perimeter of the container wherein the container is suspended to said hanger by a plurality of outer fastening devices that move from distal positions relative to a center of said hanger to proximal positions relative to said center of said hanger, the distal positions being located below the proximal positions;

applying a biasing force to said outer fastening devices attached to said hanger so that said outer fastening devices are urged toward said center of said hanger in the absence of a counteracting force and, when at least a partially loaded container is attached to said outer fastening devices, said outer fastening devices are disposed away from said center of said hanger; and unloading the contents of the container through the neck thereof so that as the weight of the container falls, said biasing force applied to said outer fastening devices counteracts the weight of the container so that said outer fastening devices move inwardly and upwardly so as to displace the outer perimeter of the container inwardly and upwardly so that a bottom portion of the container develops an approximately inwardly tapered profile around the neck of the container.

12. The method of unloading a container of claim 11, wherein the container includes a liner disposed between the material and the container, further including the step of:

connecting a center portion of the liner to said hanger by a biasing mechanism located below said hanger so that as the weight of the container falls as the container is unloaded, the liner is urged upwardly toward said hanger.

* * * * *